United States Patent
Clever et al.

(10) Patent No.: US 8,677,968 B2
(45) Date of Patent: Mar. 25, 2014

(54) ENCAPSULATED BALANCE SHAFT AND METHOD

(75) Inventors: Glenn E. Clever, Washington, MI (US); Charles K. Buehler, Lansing, MI (US)

(73) Assignee: GM Global Technology Operations LLC, Detroit, MI (US)

(*) Notice: Subject to any disclaimer, the term of this patent is extended or adjusted under 35 U.S.C. 154(b) by 358 days.

(21) Appl. No.: 13/233,305

(22) Filed: Sep. 15, 2011

(65) Prior Publication Data
US 2013/0068187 A1 Mar. 21, 2013

(51) Int. Cl.
*F02B 75/06* (2006.01)
(52) U.S. Cl.
USPC .......................... 123/192.2; 74/603
(58) Field of Classification Search
USPC ......................... 123/192.2; 74/603
See application file for complete search history.

(56) References Cited

U.S. PATENT DOCUMENTS 5,483,932 A * 1/1996 Friedman et al. .......... 123/192.2
5,791,309 A * 8/1998 Yamazaki et al. ......... 123/192.2

* cited by examiner

*Primary Examiner* — Noah Kamen
(74) *Attorney, Agent, or Firm* — Quinn Law Group, PLLC

(57) ABSTRACT

A shaft assembly includes a shaft, a spacer and a cover. The body of the shaft includes a sealing portion, a balancing portion and a hollow portion which may collectively define a generally cylindrical space. The spacer substantially encloses the hollow portion of the body. The cover encapsulates the shaft body and the spacer to provide a substantially continuous cylindrical surface in sealing engagement with the sealing portion. The shaft assembly may be rotatably installed in an engine such that the balancing portion may be partially submerged in an oil bath in the engine and such that the substantially continuous cylindrical surface of the cover minimizes turbulence and aeration of the oil bath when the shaft assembly is rotated. The shaft may be configured for rotation in synchrony with a crankshaft. A method for encapsulating the shaft includes forming a continuous cylindrical surface in sealing engagement with the shaft body.

20 Claims, 4 Drawing Sheets

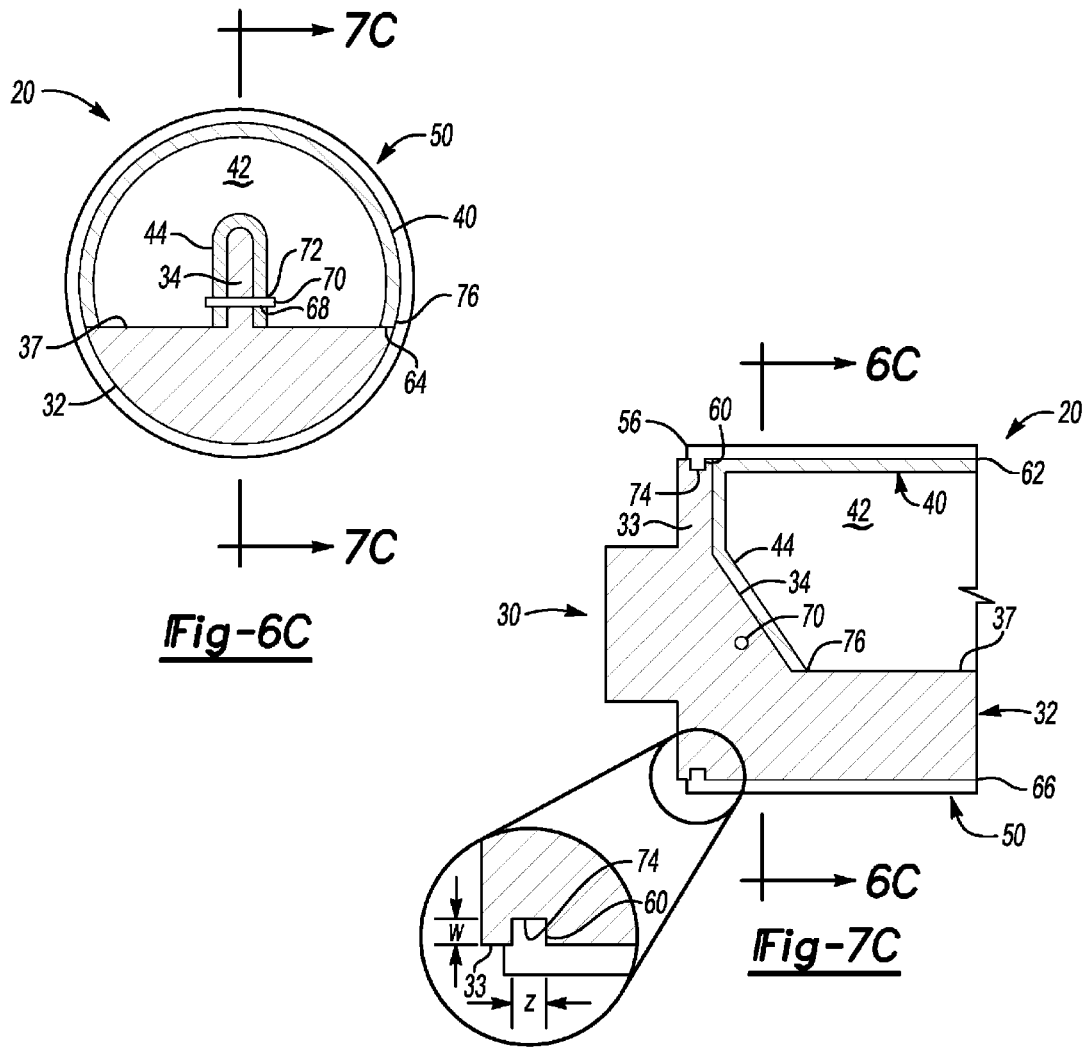

ENCAPSULATED BALANCE SHAFT AND METHOD

TECHNICAL FIELD

The present invention relates to a balance shaft for an engine.

BACKGROUND

A balance shaft generally includes a balancing portion which provides an eccentric weight to offset vibrations in the engine which are not inherently balanced. For example, a balance shaft may be used in a combustion engine to offset vibrations from a crankshaft, where the balance shaft and crankshaft are rotated in opposite directions to cancel out vibrations in the engine.

In some engine configurations, the balance shaft may be positioned such that during rotation it is at least partially submerged in the engine oil within an oil reservoir. The rotating balancing portion of the balance shaft may create significant turbulence in the engine oil by repeated contact between the external surfaces of the eccentric or balancing portion of the balance shaft and the oil in the reservoir, causing aeration of the oil, which may cause cavitation, reduce oil cooling capacity and oil life, and/or cause other effects which may be detrimental to engine performance.

SUMMARY

A balance shaft partially submerged in engine oil may be encapsulated to provide a continuous surface in rotational contact with the engine oil to substantially reduce or eliminate the magnitude of engine oil turbulence resultant from rotation of the balance shaft during engine operation. An encapsulated balance shaft and a method of encapsulating a balance shaft are provided herein. The encapsulated balance shaft may be configured for use in a system or application where a balance shaft is required. For example, the encapsulated balance shaft may be configured for use in an engine, where the engine may be configured such that the balance shaft including the balancing weight portion is at least partially submerged in oil when rotating. The engine may be a relatively small or compact engine such as a two cylinder engine, which may be configured to minimize packaging space by placing the balance shaft in close proximity to the engine crankshaft.

The balance shaft may be configured as a shaft assembly including a shaft, a spacer and a cover. The shaft includes a body, wherein the body may include or define a sealing portion, a balancing portion and a hollow portion, which may collectively define a generally cylindrical space. The spacer may be positioned in proximate contact with the shaft body and may be configured to substantially enclose the hollow portion of the shaft. The cover encapsulates the shaft body and the spacer to define a substantially continuous cylindrical surface. The cover is in sealing engagement with the sealing portion of the shaft.

The shaft assembly may be configured for installation in an engine such that the shaft assembly is rotatable about an axis of rotation defined by the shaft. In the installed position, the balancing portion may be partially submerged in an oil bath in the engine, such that the balancing portion is rotatable through the oil bath when the installed shaft assembly is rotated in the engine, and such that the substantially continuous cylindrical surface of the cover minimizes at least one of turbulence and aeration of the oil bath when the shaft assembly is rotated. In one example, the shaft may be configured as a balance shaft for rotation in synchrony with a crankshaft.

At least one of the spacer and the shaft body may be configured to be operatively attached to the other of the spacer and the shaft body. The spacer and/or the shaft body may include a feature configured to locate and/or retain the spacer in a position relative to and in proximate contact with the shaft body. The cover may be formed to exert a compressive force on the spacer such that the spacer is held in proximate contact with the shaft body. The spacer may be configured to provide structural support to the cover, for example, to reinforce and/or substantially prevent distortion of the cover in the engine.

A method for encapsulating a shaft is provided. The method includes positioning a spacer in proximate contact with a shaft including a body, wherein the shaft body includes a sealing portion, a balancing portion and a hollow portion, and the spacer is configured to substantially enclose the hollow portion of the body. The method may include retaining the spacer in proximate contact with the body, for example, using a retention feature defined by the spacer and/or the body. The method further includes forming a cover such that the cover encapsulates the body and the spacer. The cover as formed defines a substantially continuous cylindrical surface in sealing engagement with the sealing portion of the body. The forming process may include providing the shaft and spacer as an insert to a mold cavity, wherein the mold cavity defines the substantially continuous surface of the cover, and forming the cover using an over molding process. During formation of the cover, e.g., during encapsulation of the shaft body, the cover material may shrink or otherwise contract such that the cover exerts a compressive force on the spacer and against the shaft body.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 6C is a schematic cross-sectional view of a third example configuration of the encapsulated balance shaft assembly of FIG. 5;

FIG. 7C is partial schematic cross-sectional view of the encapsulated balance shaft assembly of FIG. 6C.

DETAILED DESCRIPTION

Figure 1:
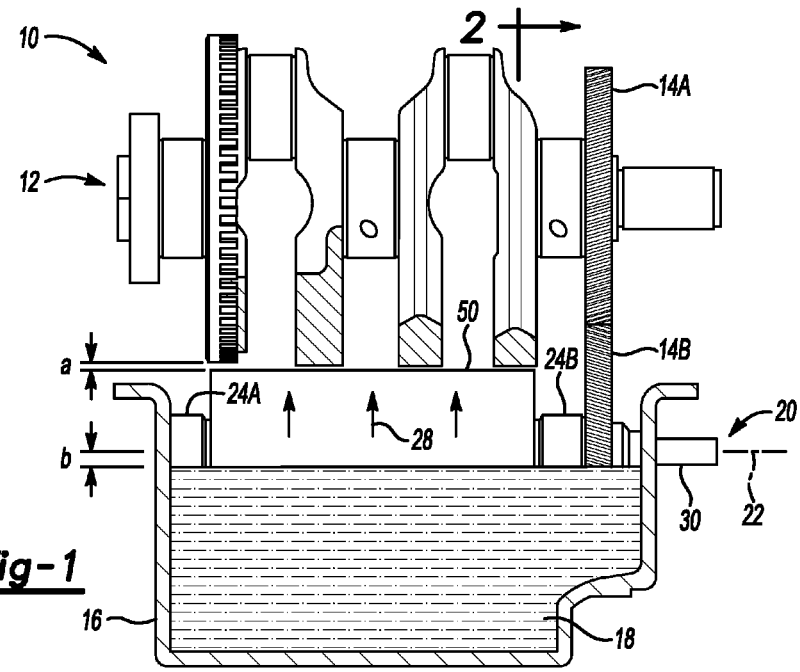
FIG. 1 is a schematic cross-sectional view of an engine including an encapsulated balance shaft assembly.

A balance shaft assembly as described herein is encapsulated to provide a substantially smooth and/or continuous surface in rotational contact with an oil bath in an engine to substantially reduce or eliminate the magnitude of oil turbulence and/or oil aeration resultant from rotation of the balance shaft during engine operation. The encapsulated shaft assembly includes a hollow spacer which provides an advantage of lower weight, and may also be configured to provide a reinforcing or supportive structure facilitating formation of and/or preventing distortion of the encapsulating cover. The cover may be configured in sealing engagement with the body of the shaft to prevent ingression of oil into the hollow portion of the balance shaft, thereby preventing retention of oil in the shaft assembly and any unbalancing effect thereof to the shaft assembly and/or engine. The balance shaft assembly may be configured for use in a system or application where a balance shaft is required. For example, the balance shaft assembly may be configured for use in an engine, which may be a relatively small or compact engine such as a two cycle engine, which may be configured to minimize packaging space by placing the balance shaft in close proximity to the engine crankshaft. A method of making the encapsulated shaft assembly is provided herein.

Referring to the drawings wherein like reference numbers represent like components throughout the several figures, the elements shown in FIGS. 1-7C are not to scale or proportion. Accordingly, the particular dimensions and applications provided in the drawings presented herein are not to be considered limiting.

Figure 2:
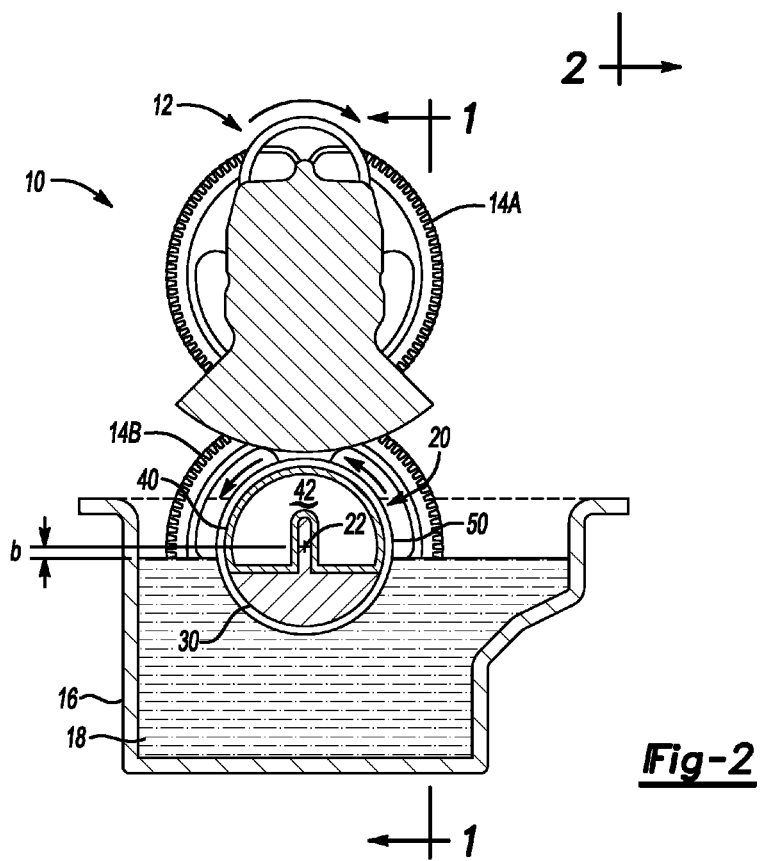
FIG. 2 is schematic cross-sectional view of section 2-2 of FIG. 1.

FIGS. 1 and 2 show a shaft assembly 20 rotatably installed in an engine 10 such that the shaft assembly 20 in the installed position is partially submerged in an oil bath 18 contained by an oil reservoir 16 of the engine 10. In the example shown in FIG. 1, the shaft assembly 20 may be configured as a balance shaft connected in a torque transmitting relationship with a crankshaft 12 by drive sprockets 14A, 14B, and may be rotated in synchrony with the crankshaft 12, to balance the crankshaft 12 and/or to reduce noise and/or vibration of the engine 10. The shaft assembly 20 includes a shaft 30, a spacer 40 (see FIGS. 2 and 3), and an encapsulating cover 50 (see also FIGS. 2 and 5). The shaft assembly 20 may also be referred to herein as an encapsulated shaft, or an encapsulated balance shaft. The shaft 30 may include bearing journals 26A, 26B (see FIG. 4) configured for rotatably mounting the shaft assembly 20 in the engine 10 via bearings 24A, 24B such that the shaft assembly 20 may be rotated about an axis of rotation 22 when driven, for example, by the crankshaft 12 and/or the sprockets 14A, 14B.

Figure 3:
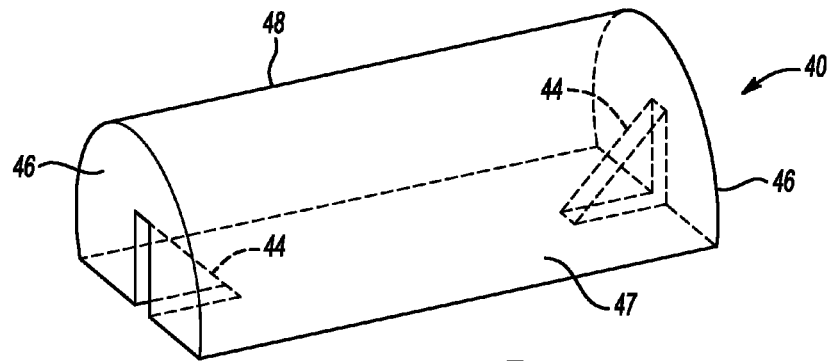
FIG. 3 is a schematic perspective view of a spacer of the balance shaft assembly of FIG. 1.
Figure 4:
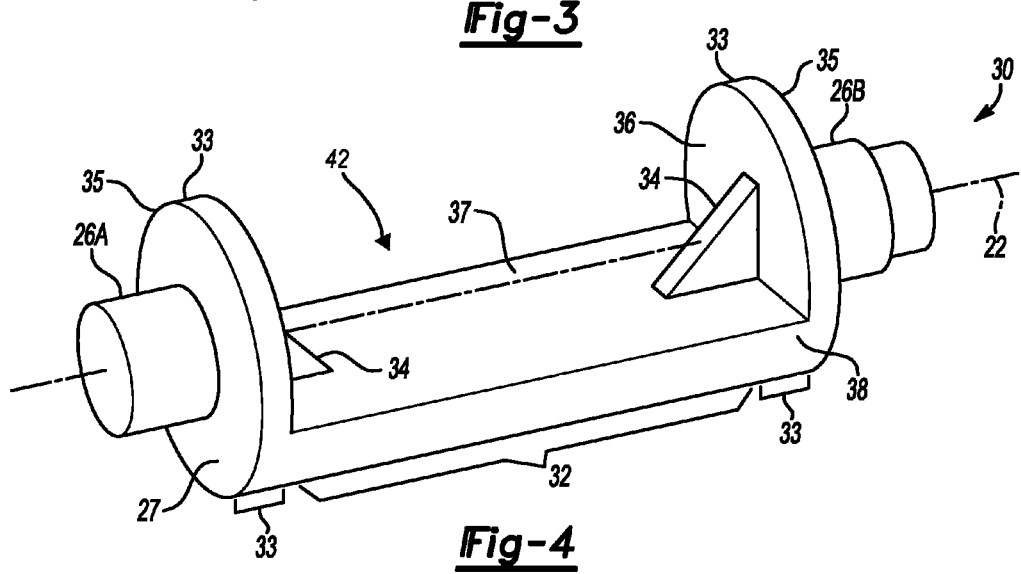
FIG. 4 is a schematic perspective view of a balance shaft of the encapsulated balance shaft assembly of FIG. 1.
Figure 5:
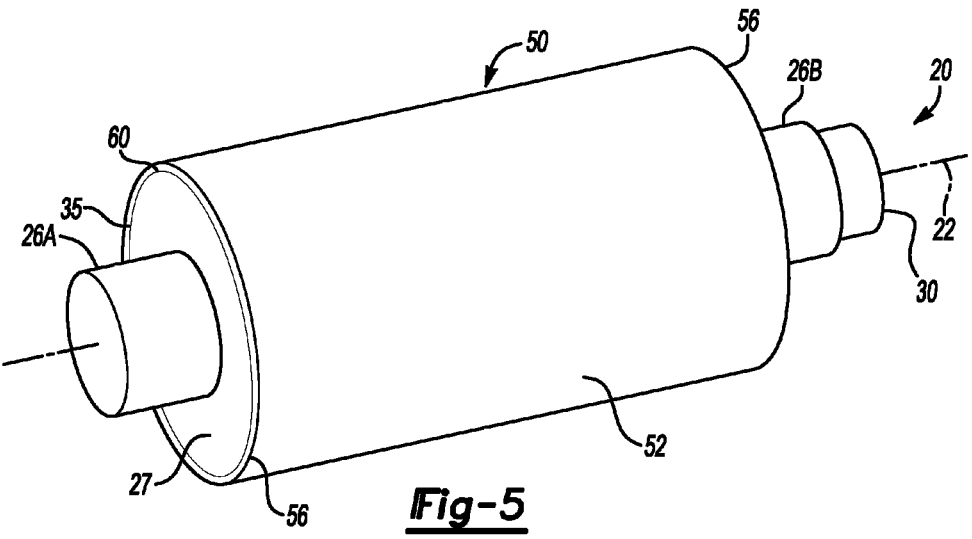
FIG. 5 is a schematic perspective view of the encapsulated balance shaft assembly of FIG. 1.

The shaft 30 may further include, as shown in FIG. 4, a shaft body generally indicated at 35, wherein the body 35 may include one or more sealing portions 33, a balancing or eccentric portion 32 and a hollow portion 42. The body 35 and/or the sealing portions 33, balancing portion 32 and hollow portion 42 may collectively define a generally cylindrical space. A spacer 40 (see FIG. 3) may be positioned in proximate contact with the body 35 and configured to substantially enclose the hollow portion 42 defined by the body 35. As shown in FIGS. 1, 2 and 5, the sealing portion 33, the balancing portion 32, and the hollow portion 42 of the body 35 defined by the body 35, and the spacer 40 may be encapsulated by a cover 50 defining a substantially continuous cylindrical surface 52 (see FIG. 5) in sealing engagement with the sealing portion 33.

As shown in FIGS. 1 and 2, in an example configuration the crankshaft 12 and the shaft assembly 20 rotate in opposing directions. The engine 10 may be configured for compact packaging, where the shaft assembly 20 may be installed in the engine 10 such that the body 35 (see FIGS. 4 and 5) of the shaft 30 encapsulated by the cover 50 may be rotated in close proximity to the rotatable crankshaft 12 with a minimal clearance a. In a non-limiting example, the clearance a may be less than 2 mm. An eccentric or balancing portion (shown in FIG. 4 at 32) of the shaft assembly 20 may be at least partially submerged in the oil bath 18 during rotation. The balancing portion 32 may be generally configured as a truncated cylinder, as shown in FIG. 4, with the truncated surface 37 being offset from the axis of rotation 22 by a distance h (see FIG. 7A). The distance h may be determined by the balancing requirements of the shaft assembly 20, the crankshaft 12, and/or the engine 10. The oil bath 18 may be of sufficient depth that the oil level is generally within a distance b of the axis of rotation 22 when the shaft assembly 30 is in an installed position in the engine 10 and with a typical oil fill volume in the oil reservoir 16. Generally, the distance b may be less than the distance h, such that as the shaft assembly 20 is rotated, the balancing portion 32 is repeatedly submerged into and rotated through the oil bath 18.

As shown in FIG. 1 the shaft assembly 20 may be rotated in the oil bath 18 such that oil is carried by the shaft assembly 20 out of the bath 18 and in a direction 28. The oil may be carried out of the bath 18 on the surface 52 (see FIG. 5) of the cover 50 encapsulating the shaft body 35. The oil carried from the bath 18 may be dispersed within the engine case, for example, onto the crankshaft 12, and/or may be retained on the surface 52 and returned to the oil bath 18. The cover 50 is configured to encapsulate the body 35 of the shaft 30 to provide a substantially continuous cylindrical surface 52, such that turbulence and/or aeration of the oil bath 18 is minimized during rotation of the shaft assembly 20 and/or recirculation of the oil carried on the cover 52 to the bath 18. The cover 50 fully encapsulates the balancing portion 32 within a generally cylindrical surface 52, such that the balancing portion 32 is not in direct contact with the oil bath 18, and is thereby prevented from causing turbulence and/or aeration of the oil in the oil bath 18. As described in detail herein, the cover 50 may encapsulate the shaft body 35 such that the cover 50 is in sealing engagement with the sealing portion 33 of shaft 30. The substantially continuous cylindrical surface 52 of the cover 50 seals the balance shaft assembly 20 from ingression of oil into the hollow portion 42 of the shaft 30, e.g., into the body 35 of the shaft 30, thereby preventing any change in the balancing attributes of the shaft assembly 20 which may result from oil leakage through the cover 50.

Figure 6A:
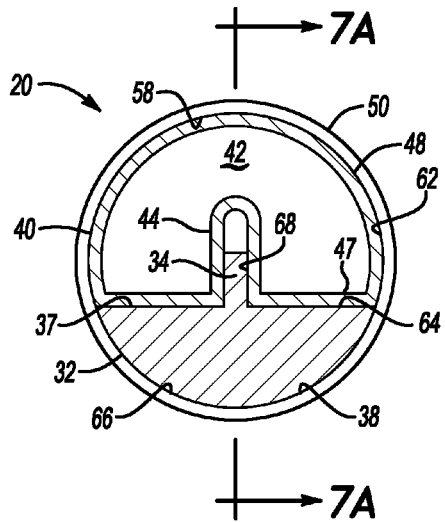
FIG. 6A is a schematic cross-sectional view of a first example configuration of the encapsulated balance shaft assembly of FIG. 5.
Figure 7A:
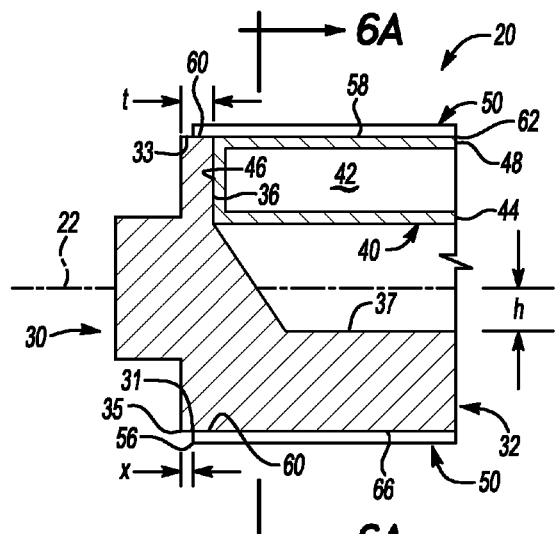
FIG. 7A is partial schematic cross-sectional view of the encapsulated balance shaft assembly of FIG. 6A.
Figure 6B:
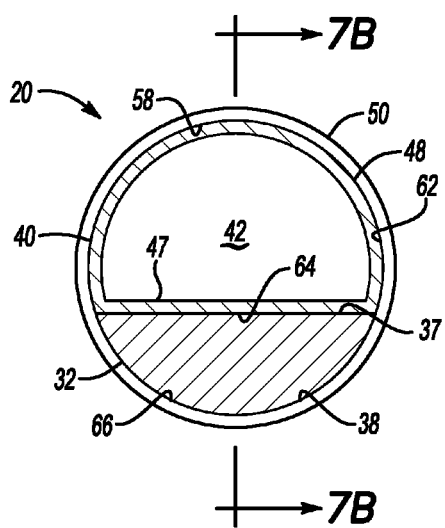
FIG. 6B is a schematic cross-sectional view of a second example configuration of the encapsulated balance shaft assembly of FIG. 5.

Referring to FIG. 3, the spacer 40 is shown, in a non-limiting example, configured as a truncated cylinder including a generally cylindrical portion 48 configured to interface with the cover 50. The generally cylindrical portion 48 may also be referred to herein as an interfacing portion 48 or as an interface 48. The configuration of the spacer 40 may be varied, such that the example in FIG. 3, and the alternative embodiments described related to FIGS. 6A-7C are not intended to be limiting. For example, the spacer 40 may consist of the interfacing portion 48 to define a C-shaped or open-sided channel, which may be seated or positioned on the truncated surface 37 of the shaft 30 via edges 76 of the open-sided channel, as shown in FIG. 6C. The spacer 40 may be fully enclosed, as shown in FIG. 3 and the alternative configurations shown in FIGS. 6A-6B and 7A-7B, or may be partially enclosed, as shown by the example of FIGS. 6C and 7C. The spacer 40 may include one or more end portions 46, which may be configured to shape, support, and/or reinforce the interface 48 and/or the spacer 40, and/or to provide an interfacing portion to interface with one or more surfaces 36 (see FIG. 4) of the shaft 30. The end portion 46 may also be referred to herein as an interfacing portion 46. The spacer 40 may include a base portion 47, which may be configured to shape, support, and/or reinforce the interfacing portion 48 and/or the spacer 40, and/or to provide an interfacing portion to interface at 64 with the truncated surface 37 (see FIG. 4) of the shaft 30. The base portion 47 may also be referred to herein as an interfacing portion 47. One or more of the end portions 46 and/or the base portion 47 may be combined with the cylindrical portion 48 to define a partially or fully enclosed spacer 40. For example, referring to FIGS. 3, 6C and 7C, one or more end portions 46 including a locating slot 44 may be combined with the cylindrical portion 48 comprising the spacer 40, which as shown in FIGS. 6C and 7C, is absent a base portion such that the spacer 40 is open ended and in proximate contact with the shaft body 30 at least where the truncated surface 37 of the balancing portion 32 interfaces as indicated at 64 with the perimeter edges 76 of the cylindrical portion 48.

The spacer 40 may be configured to substantially fill and/or enclose the hollow portion 42 of the shaft body 35, and to be in proximate contact with the shaft body 35. The spacer 40 may be operatively attached to the shaft 30, such that the spacer 40 may be retained in a position relative to the shaft body 35, for example, during encapsulation of the shaft 30 and the spacer 40 by formation or application of the cover 50, and/or to define, in combination with the shaft body 35, a generally cylindrical shape for encapsulation by the cover 50. The spacer 40 may be configured to provide a reinforcing and/or structural support to the cover 50 and/or to minimize or substantially prevent distortion, creep, warpage and/or other movement of the cover 50 during use and operation in the engine 10. By reinforcing, supporting and/or minimizing movement of the cover 50, the spacer 40 may also contribute to the integrity and durability of the sealed interface 60 (see FIGS. 7A-7C) between the cover 50 and the shaft 30.

The spacer 40 may be configured to prevent or minimize movement of the spacer 40 with respect to the cover 50 and/or the shaft 30, to minimize noise or rattle attributable to movement or resultant from the spacer 40 during operation of the shaft assembly 20 in the engine 10, and to support the integrity and durability of the sealed interface 60. The spacer 40 may be configured as a fully enclosed unit, for example, as shown in FIG. 3, to minimize or limit the volume of oil which may enter into the balance shaft assembly 20 in the event of oil leakage into the shaft assembly 20, through the sealed interface 60 or otherwise, for example, through damage to the cover 50 during assembly or service of the engine or by contaminants carried in the oil, etc. By providing a fully enclosed spacer 40 to minimize oil ingression into or oil retention by the shaft assembly 20, any unbalancing effect due to oil in the shaft assembly 20 will be minimized or substantially avoided.

It would be understood that the configuration of the spacer 40 may be varied, and the examples provided herein are not intended to be limiting. The spacer 40 as shown in FIG. 3 is configured as a hollow spacer, which may provide an advantage of weight reduction to the shaft assembly 20. In another configuration, the spacer 40 may be configured as a solid part (not shown) which may be formed of one or more materials. For example, the spacer 40 may be an insert molded or injection molded solid part formed of a homogenous material. In another example, the spacer 40 may be formed as a solid part including a shell portion formed of a first material and a core portion formed of a second material. The core portion material may be a lightweight material such as a foam material, to minimize any unbalancing effect thereof to the shaft assembly. In another example, the spacer 40 may be formed or molded as a semi-solid part (not shown), e.g., the spacer 40 may include one or more hollow portions which may be configured to minimize the weight of the spacer 40 and/or as required to provide the required offset and/or eccentricity to satisfy the balancing requirements of the assembly 20 in combination with the shaft 30.

The spacer 40 may be positioned in proximate contact with the shaft body 35 to enclose the hollow portion 42 by any sufficient means. For example, the spacer 40 may be held in proximate contact with the shaft body 35 during a molding or assembly operation forming or applying the cover 50 to the shaft 30. The spacer 40 may be operatively attached to the shaft body by an adhesive (not shown), for example, applied at one or more of the interfaces 64, 68 (see FIGS. 6A, 6C) which may be defined by contacting surfaces of the spacer 40 and the shaft body 35. The adhesive may be temporary or of minimal strength, sufficient to hold the spacer 40 in position during encapsulation by the cover 50, or may be of a more permanent type.

The spacer 40 may include one or more retention features which may be configured to retain the spacer 40 in proximate contact with the shaft body 35. The spacer 40 and/or the shaft body 35 may be configured to provide an interference fit between respective features of the spacer 40 and the shaft 30 such that the spacer 40 may be retained in position to substantially enclose the hollow portion 42. In one example, the spacer 40 may be molded so as to be substantially conforming to or slightly oversized to the surfaces of the shaft body 35 at least partially defining the hollow portion 42, such that the spacer 40 may be compressed into the hollow portion 42 and held in position proximate to the shaft body 35. In another example, the shaft body 35 and the spacer 40 may be configured such that an interference fit is provided between the end portions 36 and the end portions 46 (see FIG. 7A) to operatively retain the spacer 40 in a position to enclose the hollow portion 42 of the shaft 30.

In yet another example, as shown in FIG. 3, the spacer 40 may include a feature 44, which may be used to locate and/or retain the spacer 40 in a predetermined position such that the spacer 40 encloses the hollow portion 42. The feature 44 may be configured to be located with respect to, substantially conform to, and/or provide an interference fit with, a feature, for example, a feature 34 shown as a rib in FIG. 4, of the shaft body 35. In the non-limiting example shown by FIGS. 3 and 4, and referring also to FIGS. 6A, 6B, 7A and 7B, the feature 44 may be configured as a slot 44 molded into or otherwise integrally formed in the spacer 40. The slot 44 may be configured to fit over and/or onto the rib 34. The slot 44 and the rib 34 may interface, for example, as indicated at 68 in FIG. 6A, with a slip fit, e.g., with clearance between the surfaces of the slot 44 and rib 34, such that the rib 34 acts as a locating feature with the slot 44 to position the spacer 40 relative to the shaft body 35. The slot 44 and the rib 34 may interface at 68, with an interference fit, e.g., with no clearance between the surfaces of the slot 44 and the rib 34, or such that one of the slot 44 and the rib 34 exerts a compressive or retentive force on the other, so as to locate and retain the spacer 40 proximate to the shaft 30. The shaft assembly 20 may include more than one retention and/or location feature. For example, as shown in FIG. 3, the spacer 40 includes two slots 44, which may each be located with respect to one of the ribs 34 of the shaft 30 shown in FIG. 4. The spacer 40 may include a single slot 44 running the length of the spacer 40, as illustrated in FIGS. 6A and 7A, such that the single slot 44 fits over and/or interfaces with both of the ribs 34.

The spacer 40 may include a combination of retention and/or location features. For example, the slots 44 may provide a locating feature to locate the spacer 40 with respect to the shaft body 35 while the end portions 46 may provide a retention feature by creating an interference fit between the spacer 40 and the end portions 36 of the shaft body 35. In another example shown in FIGS. 6C and 7C, the slot 44 may include one or more openings 72 which are configured to fit over or onto a protuberance of the shaft body 35. The protuberance may be, for example, provided by one or more ends of a pin 70 inserted through the rib 34, such that when a slot 44 of the spacer 40 is fitted or located over a rib 34, the opening 72 engages with the protruding end of the pin 70 to retain the spacer 40 to the shaft 30. The configuration of the retaining and/or locating features of the spacer 40 and/or the shaft body 35 are not limited to the illustrative examples shown in FIGS. 1-7C. For example, a locating and/or retaining feature may be molded, cast, machined or otherwise incorporated into one or both of the spacer 40 and/or the shaft body 35, or may be included as an additional element such as a pin, clip or other attachable feature or device. Pin to hole, ridge to groove, clipped, snapped, or other combinations of attachable features may be used, for example, to configure the locating and/or retaining features positioning the spacer 40 in proximate contact with the shaft body 35. A retaining and/or locating feature of the spacer 40 and/or the shaft 30 may be a feature provided for other purposes, e.g., the retaining and/or locating features may be multifunctional. For example, and referring to FIG. 4, the rib 34 may be a reinforcing rib to increase the torsional and/or bending strength of the shaft 30, however may also be configured to provide a locating and/or retention surface to interface with a feature of the spacer 40. For example, and referring to FIGS. 3 and 6A-7C, the slot 44 of the spacer 40 may provide additional dimensional stability and strength to the spacer 40, to increase the structural support and/or reinforcement the spacer 40 may provide to the cover 50.

The spacer 40 may be made of a material which is thermally and dimensionally stable, for example, at the operating temperatures of the shaft assembly 20 within the engine 10, and which is formable to provide the lightweight, hollow structure of a spacer 40 as described herein. In a preferred configuration, the material is chemically resistant, e.g., impermeable to fluids present in engine operating environments, which may include engine lubricants, including synthetic and non-synthetic oils, methanol, ethanol, water, and/or other fluids which may include contaminants present in engine operating environments. The formable material may be a polymer-based material which may be formable into a spacer 40, for example, by blow molding, insert molding, injection molding, or other polymer molding methods. The polymer-based material may be, for example, a nylon-based material, a polyphthalamide-based material, a high performance polyamide-based (PPA) material, a polyphenylene ether-based (PPE) material, or a combination of these. The material may be a fiber-reinforced polyamide based material. In one embodiment, the material forming the spacer 40 may have substantially the same thermal expansion characteristics as the material forming the cover 50, such that when the shaft assembly 20 is in use, e.g., in operation in the engine 10, the spacer 40 and the cover 50 expand and contract in similar magnitude. In another embodiment, the material forming the spacer 40 may have lower shrinkage than the material forming the cover 50, such that when the shaft assembly 20 is in use, e.g., in operation in the engine 10, the cover 50 contracts at a higher rate than the spacer 40, so as to exert a compressive force on the spacer 40, to retain the spacer 40 in position, e.g., to prevent movement of the spacer 40 which may contribute to noise or rattling, and/or to provide a sealing interface between the cover 50 and the spacer 40. In another example, substantially similar materials are used to form the spacer 40 and the cover 50. For example, the spacer 40 and the cover 50 may each be formed from one of a polyphthalamide-based material, a high performance polyamide-based (PPA) material, a polyphenylene ether-based (PPE) material, wherein the material forming the cover 50 may also included and/or be reinforced with a filler, such as a glass or fiber material for additional strength and/or stability. The examples provided are not intended to be limiting. For example, the spacer 40 may be formed from other materials, including metallic materials such as aluminum-based or other lightweight metallic materials, and/or other polymeric, non-metallic materials, including foams and composites, which may be formable into a spacer 40.

FIG. 4 shows a shaft 30, which may be configured as a shaft 30 in the shaft assembly 20 shown in FIGS. 1 and 2. The shaft 30 includes a shaft body generally indicated at 35. The shaft body 35 may include one or more sealing portions 33, a balancing portion 32 and a hollow portion 42. The shaft 30 may include one or more bearing journals 26A, 26B configured for rotatably mounting the shaft 30 such that the shaft 30 may be rotated about an axis of rotation 22. The shaft 30 may include other features or sections (not shown) for mounting the shaft 30, for example, in the engine 10, for attachment of other components such as the drive sprocket 14B or other gears (not shown), etc.

The shaft 30 may be configured as an eccentric shaft, also referred to as a balance shaft including a balancing or eccentric portion 32. The balancing portion 32 is characterized by a center of gravity which is offset from the axis of rotation 22 of the shaft 30, such that as the shaft 30 is rotated relative to another rotating and/or unbalanced component such as the crankshaft 12, the shaft 30 may offset or compensate for the unbalance of the other component to reduce vibration and noise in the system.

The balancing portion 32, the sealing portions 33 and the hollow portion 42 may collectively define a generally cylindrical space. As shown in FIG. 4, the body 35 may also define one or more exterior end faces 27, and an exterior surface 38. As described previously, the balancing portion 32 in the example shown in FIG. 4 may be generally configured as a truncated cylinder at least partially defined by the exterior surface 38 and the truncated surface 37. It would be understood that the configuration of the balancing portion 32 may be varied as required to provide the required offset and/or eccentricity to satisfy the balancing requirements of the particular system 10 or assembly 20 into which the shaft 30 is installed or incorporated. For example, the sealing portion 33 may be shaped as one of a circular cylinder, an oval cylinder, an elliptical cylinder, an oblique cylinder, or other generally cylindrical shape, which when encapsulated by the cover 50 may provide a continuous cylindrical surface 52 (see FIG. 5). For example, the balancing portion 32 may be shaped as one of or a portion of a circular cylinder, an oval cylinder, an elliptical cylinder, an oblique cylinder, or other generally cylindrical shape which when encapsulated by the cover 50 may provide a continuous cylindrical surface 52 (see FIG. 5). For example, the generally cylindrical space defined by the shaft body 35 including the hollow portion 42 may be shaped as one of a circular cylinder, an oval cylinder, an elliptical cylinder, an oblique cylinder, or other generally cylindrical shape which when encapsulated by the cover 50 may provide a continuous cylindrical surface 52 (see FIG. 5). As shown in FIG. 4, the hollow portion 42 may be partially defined by the truncated surface 37 and interior end faces 36. In the present example, the hollow portion 42 may be further defined by the ribs 34.

The shaft body 35 includes one or more sealing portions 33. In the example shown in FIG. 4, the sealing portions 33 are configured as generally cylindrical sections at opposing ends of the shaft body 35. The sealing portions 33 may be of a minimum thickness t to provide a sufficient surface area to engage with the cover 50 to form a seal 60, e.g., to be in sealing engagement with the sealing portion 33. The seal 60 formed between the sealing portion 33 and the cover 50 may also be referred to herein as a sealing interface. The sealing interface 60 may be variously configured to provide sufficient sealing engagement between the shaft body 35 and the cover 50 to encapsulate the shaft body 35 and spacer 40 and to prevent the ingression of fluids including but not limited to engine lubricants and water, or other contaminants, through the sealing interface 60.

Referring now to FIG. 5, shown is an example configuration of the cover 50. The cover 50 is configured to encapsulate the shaft body 35 and the spacer 40, as shown in FIGS. 2 and 6A-7C, and to form or define a substantially continuous cylindrical surface 52 in sealing engagement with the sealing portion 33 of the body 35. The substantially continuous cylindrical surface 52 may also be referred to as a continuous surface, a smooth surface, and/or a continuous surface, where each of these terms and the term "substantially continuous surface" as used herein is intended to indicate a surface which when rotated in contact with a fluid bath, such as the oil bath 18 shown in FIGS. 1 and 2, interacts with the fluid to cause minimal or no aeration of the fluid, or to cause minimal or no turbulence of the fluid at the interface of the cover surface 52 and the fluid bath. For example, the substantially continuous surface 52 may be configured with a smooth surface texture such that discontinuities in the surface 52 are minimal or absent, e.g., the continuous surface 52 would be one which is not dis-continuous, e.g., the surface 52 would not have any significant discontinuities. In another example of a continuous surface 52, the surface 52 may be defined by a minimal surface texture, e.g., may be nearly smooth, or may be defined by a texture pattern oriented on the surface 52 to minimize or eliminate turbulence or aeration of the fluid bath when the surface 52 is rotated through the fluid bath in an installed and/or operating position. In the example shown in FIGS. 1 and 2, the installed and/or operating position would be the position of the cover 50 and its surface 52 encapsulating the shaft assembly 20, and rotating in the direction shown in FIG. 2 such that oil from the oil bath 18 is carried out of the oil bath 18 on the surface 52 in a direction 28. At least a portion of the oil carried from the bath 18 may be returned to the bath 18 from the surface 52 as the shaft assembly 20 is rotated. The surface 52 is characterized as substantially continuous, continuous and/or smooth based on the non-turbulence characteristics of the fluid flow of the fluid, e.g., the oil in the oil bath 18, at the surface 52 during rotation of the shaft assembly 20 and/or a lack of aeration of the oil in the oil bath 18 resultant from or attributable to the rotation of the encapsulated balance shaft 20.

The cover 50 may be formed to encapsulate the body 35 and the spacer 40 by molding the cover 50 over the shaft body 35 and the spacer 40 such that the cover 50 is formed or molded to define a substantially continuous cylindrical surface 52 in sealing engagement with the sealing portion 33 of the body 35. By way of example, the molding process may be an over molding process or an insert molding process. The process may include positioning the spacer 40 in proximate contact with the shaft body 35 in a mold cavity (not shown), and overmolding the spacer 40 and shaft 30 to form the cover 50, for example, by injecting or otherwise providing a moldable material into the mold cavity, where the moldable material is transformed into the cover 50. The mold cavity may be configured to define the substantially continuous cylindrical surface 52. The surfaces of the spacer 40 and the shaft 30 interfacing with the interior surface 58 of the cover 50 including, at least, surfaces 38 and 48 (see FIGS. 3, 4, and 6A-7C) may cooperate with the mold cavity to define the configuration of the cover 50 including an interior surface 58 of the cover 50. The interior surface 58 of the cover 50 is formed in proximate contact with, e.g., substantially conforming to at least the surfaces 38 and 48 to define respective interfaces 66 and 62 shown in FIG. 6A. The mold cavity may be configured to form the sealing interface 60, for example, by providing for flow of the moldable material to define an outermost edge 56 of the cover 50, and to provide sealing engagement of the cover 50 with the sealing portion 33 of the body 35, as will be described in further detail herein. The spacer 40 enclosing the hollow portion 42 may be configured to provide structural support during molding of the cover 50 and the substantially continuous cylindrical surface 52.

The cover 50 may be made of a material which is thermally and dimensionally stable, for example, at the operating temperatures of the shaft assembly 20 within the engine 10, and which is formable to provide an encapsulating cover 50 including a substantially continuous surface 52, wherein the cover 50 is in sealing engagement with the shaft 30, as described herein. In a preferred configuration, the material is chemically and acidic resistant, e.g., resistant to and/or impermeable by fluids present in engine operating environments, which may include engine lubricants, including synthetic and non-synthetic oils, methanol, ethanol, water, and/or other fluids which may include contaminants present in engine operating environments, and resistant to corrosive decomposition. The material may be sufficiently tough and/or abrasion resistant to be resistant to surface deterioration or other factors which may affect the fluid flow behavior at the surface 52, for example, by affecting the smoothness or continuity of the substantially continuous surface 52 of the cover 50 in operation. The formable material may be a polymer-based material which may be formable into a cover 50 encapsulating the shaft body 35 and spacer 40. As described previously, the cover 50 may be formed by a molding process, such as over molding, where the shaft 30 and spacer 40 may be provided together as an insert to be over molded in the mold cavity.

The polymer-based material may be, for example, a nylon-based material, a thermoplastic material, or a combination of these. The polymer-based material may have a melting point above 250° C. The polymer-based material may be a polyphthalamide-based material, a high performance polyamide-based (PPA) material, a polyphenylene ether-based (PPE) material, or a combination of these. The material may be a glass or fiber-reinforced polyamide based material. In one embodiment, the material forming the cover 50 may have substantially the same thermal expansion characteristics as the material forming the spacer 40, such that when the shaft assembly 20 is in use, e.g., in operation in the engine 10, the spacer 40 and the cover 50 expand and contract in similar magnitude. In another embodiment, the material forming the cover 50 may have higher shrinkage than the material forming the spacer 40, such that when the shaft 30 and spacer 40 is over molded and/or the shaft assembly 20 including the cover 50 is in operation in the engine 10, the cover 50 may contract at a higher rate than the spacer 40 to exert a compressive force on the spacer 40 thereby retaining the spacer 40 in position or preventing rattling of the spacer 40, and/or such that the spacer 40 may resist the compressive force of the cover 50 thereby reinforcing and/or providing structural support to the cover 50 as it contracts, and/or such that a sealing interface between the cover 50 and the spacer 40 may be provided. In another example, substantially similar materials are used to form the spacer 40 and the cover 50. For example, the spacer 40 and the cover 50 may each be formed from one of a polyphthalamide-based material, a high performance polyamide-based (PPA) material, a polyphenylene ether-based (PPE) material, wherein the material forming the cover 50 may also included and/or be reinforced with a glass or fiber material for additional strength and/or stability.

Various configurations of the sealing portion 33 and/or the cover 50 may be used to form the sealing interface 60 and the examples described herein are intended to be non-limiting. Referring to FIG. 5, the cover 50 may be formed such that the outermost edge 56 of the cover 50 extends to the end face 27 of the shaft 30, e.g., the cover 50 fully encapsulates the sealing portion 33 of the shaft body 35 to form the sealing interface 60. In another example shown in FIG. 7A, the cover 50 may be formed such that the outermost edge 56 of the cover 50 extends at least to or into a transition area 31 proximate to the end face 27, where the thickness of the transition area 31 is indicated at x, where x is determined relative to t to provide a sufficient area of sealing interface 60.

Figure 7B:
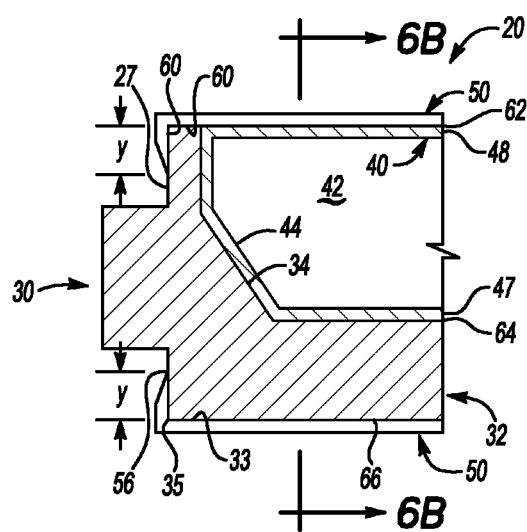
FIG. 7B is partial schematic cross-sectional view of the encapsulated balance shaft assembly of FIG. 6B.

In the example configuration shown in FIG. 7B the cover 50 is formed to encapsulate the shaft body 35 such that the edge 56 of the cover 50 extends over the sealing portion 33 and radially inward on the end face 27 for a distance y, to provide a sealing interface 60 defined by the surface of the sealing portion 33 and a portion of the end face 27. The configuration shown in FIG. 7B increases the area of the sealing interface 60 as compared with, for example, the area of the sealing interface 60 shown in FIGS. 5 and 7A. The distance y may be varied according to the configuration of the shaft 30 and the over mold process such that the cover 50 may encapsulate a portion of the end face 27 or may fully encapsulate the end face 27.

In another example configuration shown in FIG. 7C, the sealing portion 33 may include a recessed portion 74 such that the sealing interface 60 is defined by the sealing portion 33 including the recessed portion 74. The configuration shown in FIG. 7C increases the area of the sealing interface 60 as compared with, for example, the area of the sealing interface 60 shown in FIGS. 5 and 7A, and may be characterized by a sealing lip formed in the recessed portion 74. During molding of the cover 50, the material forming the cover 50 may flow into, e.g., may be molded into the recessed portion 74 such that the cover 50 is configured in sealing contact with the recessed portion 74. The recessed portion 74 may provide an interlock feature during the molding process, to facilitate adhesion of the cover 50 to the shaft body 35. In one example, the recessed portion may be configured as an annular groove. In another example, the recessed portion 74 may be configured as an undercut which may extend partially or fully around the circumference of the sealing portion 33. The cross-sectional configuration of the recessed portion 74 may be of any suitable shape. As shown in FIG. 7C, the recessed portion 74 may have a generally rectangular cross-section, however other shapes may be used including but not limited to radiused or angled cross-sections, which may be symmetrical or non-symmetrical. The examples described herein are not intended to be limiting, and the recessed portion 74 may be otherwise configured or defined by the sealing portion 33 to increase or optimize the area of the sealing interface 60 and/or increase the retention of the cover 50 to the shaft 30.

The invention claimed is:

1. A shaft assembly comprising:
a shaft including a body, wherein the body includes a sealing portion, a balancing portion and a hollow portion;
a spacer in proximate contact with the body and configured to substantially enclose the hollow portion; and
a cover encapsulating the shaft body and the spacer and defining a substantially continuous cylindrical surface in sealing engagement with the sealing portion.

2. The shaft assembly of claim 1, wherein:
the shaft assembly is configured for installation in an engine such that the shaft assembly is rotatable about an axis of rotation defined by the shaft, and the balancing portion is partially submerged in an oil bath in the engine when the shaft assembly is in the installed position; and
such that the substantially continuous cylindrical surface of the cover minimizes at least one of turbulence and aeration of the oil bath when the shaft assembly is rotated.

3. The shaft assembly of claim 1, wherein at least one of the spacer and the shaft body are configured to be operatively attached to the other of the spacer and the shaft body.

4. The shaft assembly of claim 1, wherein at least one of the spacer and the shaft body includes a retention feature configured to retain the spacer in proximate contact with the shaft body.

5. The shaft assembly of claim 1, wherein the cover includes a polymer-based material with a melting point above 250° C.

6. The shaft assembly of claim 1, wherein the cover is configured to exert a compressive force on the spacer such that the spacer is held in proximate contact with the shaft body.

7. The shaft assembly of claim 1, wherein the sealing portion defines a recessed portion and the cover is configured in sealing contact with the recessed portion.

8. The shaft assembly of claim 1, wherein the cover includes one of a polyphthalamide-based material, a high performance polyamide-based (PPA) material, a polyphenylene ether-based (PPE) material, and a filler-reinforced polyamide material.

9. The shaft assembly of claim 1, wherein the shaft is configured as a balance shaft for rotation in synchrony with a crankshaft.

10. The shaft assembly of claim 1, wherein the spacer is configured to provide structural support to the cover.

11. A method for encapsulating a shaft, the method comprising:
positioning a spacer in proximate contact with a shaft including a body, wherein:
the body includes a sealing portion, a balancing portion and a hollow portion, and
the spacer is configured to substantially enclose the hollow portion of the body; and
forming a cover encapsulating the body and the spacer wherein the cover as formed defines a substantially continuous cylindrical surface in sealing engagement with the sealing portion of the body.

12. The method of claim 11, wherein the shaft is configured for installation in an engine such that when the shaft assembly is installed in the engine the shaft is rotatable about an axis of rotation defined by the shaft and the balancing portion is partially submerged in an oil bath in the engine; and
such that the substantially continuous cylindrical surface of the cover minimizes at least one of turbulence and aeration of the oil bath while the shaft assembly in the installed position is rotated.

13. The method of claim 11, further comprising:
retaining the spacer in proximate contact with the body.

14. The method of claim 11, wherein at least one of the spacer and the body includes a retention feature configured to retain the spacer in proximate contact with the shaft body.

15. The method of claim 11, wherein forming the cover includes:
shrinking the cover during forming such that the cover exerts a compressive force on the spacer and against the shaft body.

16. The method of claim 11, wherein the sealing portion defines a recessed portion and wherein forming the cover includes configuring the cover in sealing contact with the recessed portion.

17. The method of claim 11, wherein the cover is formed from one of a polyphthalamide-based material, a high performance polyamide-based (PPA) material, a polyphenylene ether-based (PPE) material, and a fiber-reinforced polyamide material.

18. The method of claim 11, further comprising:
forming the spacer by one of blow molding, insert molding, and injection molding.

19. An engine including a balance shaft assembly, the engine comprising:
a balance shaft assembly including:
a shaft including a body, wherein the body includes a sealing portion, a balancing portion and a hollow portion;
a spacer retained in proximate contact with the body and configured to substantially enclose the the hollow portion; and
a cover encapsulating the body and the spacer and defining a substantially continuous cylindrical surface in sealing engagement with the sealing portion; and
an oil bath;
wherein the balance shaft assembly is rotatably positioned in the engine such that the balancing portion is rotatable through the oil bath; and
such that the substantially continuous cylindrical surface of the cover seals the balance shaft assembly from ingression of oil into the hollow portion and minimizes at least one of turbulence and aeration of the oil bath when the shaft assembly is rotated.

20. The engine of claim 19, wherein the spacer is configured to reinforce the cover to substantially prevent distortion of the cover in the engine.

* * * * *